United States Patent [19]

Thornton

[11] 4,437,234

[45] Mar. 20, 1984

[54] TRUSS ASSEMBLING GANTRY

[76] Inventor: Jack L. Thornton, P.O. Box 222400, Carmel, Calif. 93922

[21] Appl. No.: 339,534

[22] Filed: Jan. 15, 1982

[51] Int. Cl.³ ........................ B23P 19/00; B23P 11/00

[52] U.S. Cl. ........................................ 29/798; 29/432; 100/913

[58] Field of Search ................. 100/913, 53, 209, 210; 29/798, 432; 198/457, 392

[56] References Cited

U.S. PATENT DOCUMENTS

| | | | |
|---|---|---|---|
| 3,173,554 | 3/1965 | Ebbert | 198/372 |
| 3,538,843 | 11/1970 | Lubin | 100/913 |
| 3,785,277 | 1/1974 | Schmitt | 100/913 |
| 3,925,870 | 12/1975 | Adams | 100/913 |
| 4,084,498 | 4/1978 | Weaver | 100/913 |
| 4,295,269 | 10/1981 | Wright | 100/913 |

*Primary Examiner*—Howard N. Goldberg
*Assistant Examiner*—Steven Nichols
*Attorney, Agent, or Firm*—Robert K. Rhea

[57] ABSTRACT

An elongated platform supports the web and chord components forming a truss joist when assembled thereon to be joined by truss plates. The truss plates, when positioned at the respective juncture of the chords and webs, are pressed into place by a gantry-type power driven drum apparatus extending transversely of and supported by the platform when progressively moved longitudinally of the platform. Discharge rollers normally disposed below the upper limit of the platform lift the finished truss for movement off the platform.

6 Claims, 8 Drawing Figures

TRUSS ASSEMBLING GANTRY

BACKGROUND OF THE INVENTION

1. Field of the Invention

The present invention relates to building construction and more particularly to truss joist construction.

In home construction a plurality of truss joists are employed for supporting a floor, or the like. Truss joists typically comprise upper and lower horizontal chords interconnected in vertically spaced relation by a plurality of webs or struts inclined with respect to the chords to form a rigid support.

2. Description of the Prior Art

It has been common practice to form building truss joists from wood material, such as 2×4s, in which the inclined struts are joined to the upper and lower chords, as by nailing. More recently it is common practice to join the struts and chords to each other by using metallic plates having prongs struck out therefrom which, when a plate overlies a juncture of the strut and chord, are driven or forced into the wood, the plates sometimes being referred to as nail plates. In either event, it is a time consuming process for joining the struts and chords by nailing or using the plates which results in increased labor cost for assembly of the trusses.

This invention employes an apparatus which will press force the plates into the truss forming members by a single pass longitudinally of the prepositioned chords and struts having the plates overlying the respective chord and strut junctures.

SUMMARY OF THE INVENTION

An elongated horizontal leg supported bed or platform, dimensioned for receiving in overlying relation a truss joist to be formed, is provided at its respective longitudinal sides with underlying wide flange I-beams forming a gantry guide and support. A pair of tracks, substantially equal in height to the thickness of truss joist forming members, longitudinally overlies the upper surface of the outboard I-beam top flange adjacent the respective side edge of the platform. A gantry extends transversely of the platform and is movable longitudinal thereof. The gantry comprises a relatively large drum having a length at least coextensive with the spacing between the tracks and is supported thereby when the drum is in truss joining position. A top frame overlies the drum and a vertical frame connected with the top frame at each end of the drum support bearings journalling the respective end portions of the drum shaft. The vertical frames depend from the drum a distance spaced below the horizontal limit of the respective I-beam. Each vertical frame supports at least one vertically movable horizontally spaced bearing housing journalling a pressure roller shaft coaxially connected with a pressure roller disposed between the inner surface of the outboard upper and lower I-beam flanges. The vertical frames also support at least one pressure cylinder, having its piston secured to the respective bearing housing for the purpose of lifting the pressure roller against the upper I-beam flange to force the drum into contact with truss forming members and the respective tracks. With the pressure rollers in this position a motor, overlying the top frame at one end of the drum and drivably connected with the drum shaft, angularly rotates the drum for moving the gantry longitudinally of the platform. Operating the pressure cylinders in the other direction contacts the pressure roller with the lower I-beam flange to lift the drum off the tracks and truss forming members. With the gantry disposed at one end of the platform beyond the finished truss, a plurality of discharge rollers recessed in the platform are elevated to lift the truss and move it laterally off the platform.

The principal object of this invention is to provide a truss forming gantry including a drum moved longitudinally of a horizontal platform having truss joist forming components arranged thereon in a predetermined position for joining the truss components together by one pass of the gantry longitudinally of the platform.

DESCRIPTION OF THE PREFERRED EMBODIMENT

Figures 1, 3, 4:
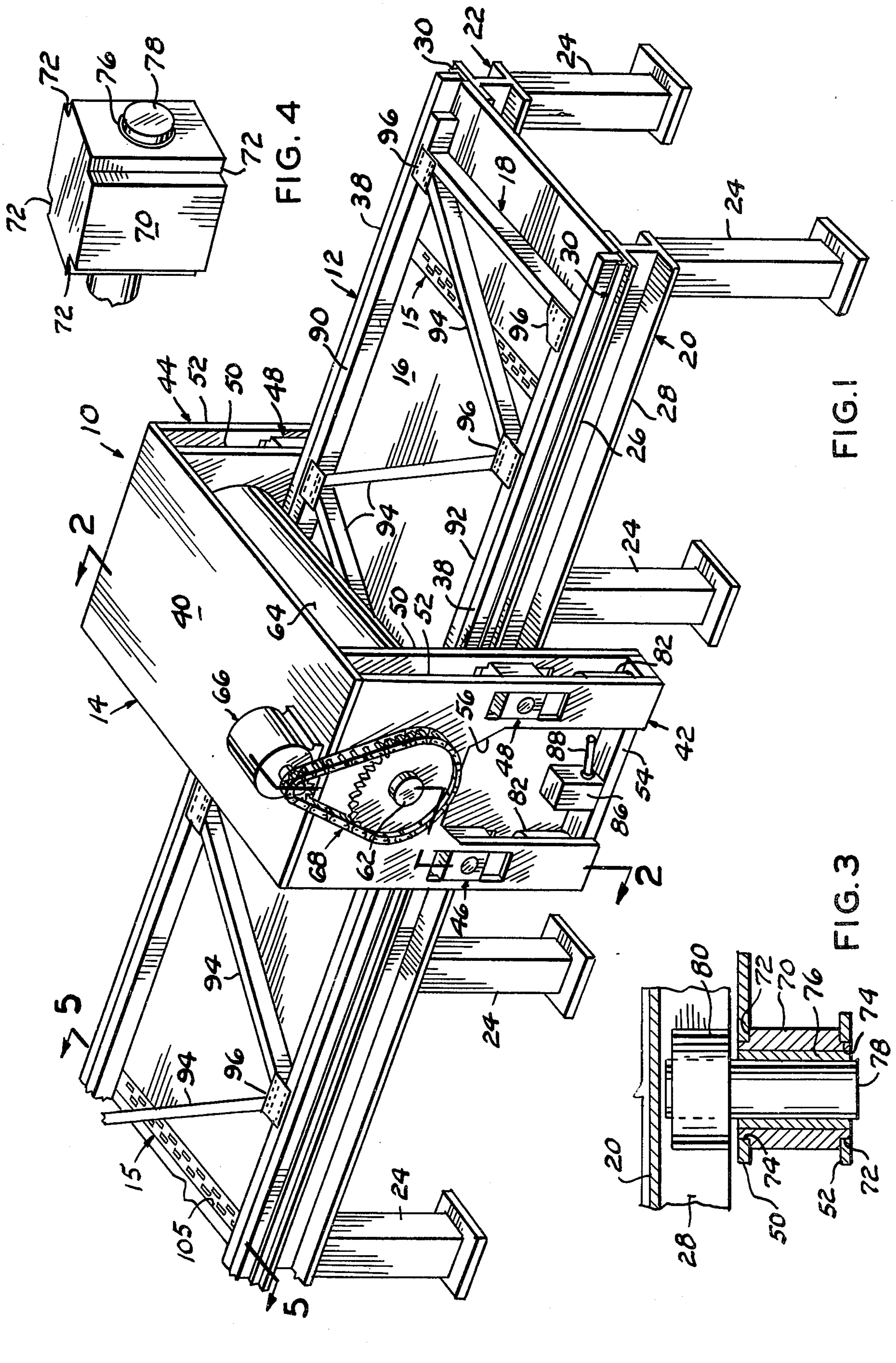
FIG. 1 is a fragmentary perspective view of the apparatus.
FIG. 3 is a fragmentary horizontal sectional view, taken substantially along the line 3—3 of FIG. 2.
FIG. 4 is a perspective view of one vertically movable bearing housing.
Figure 2:
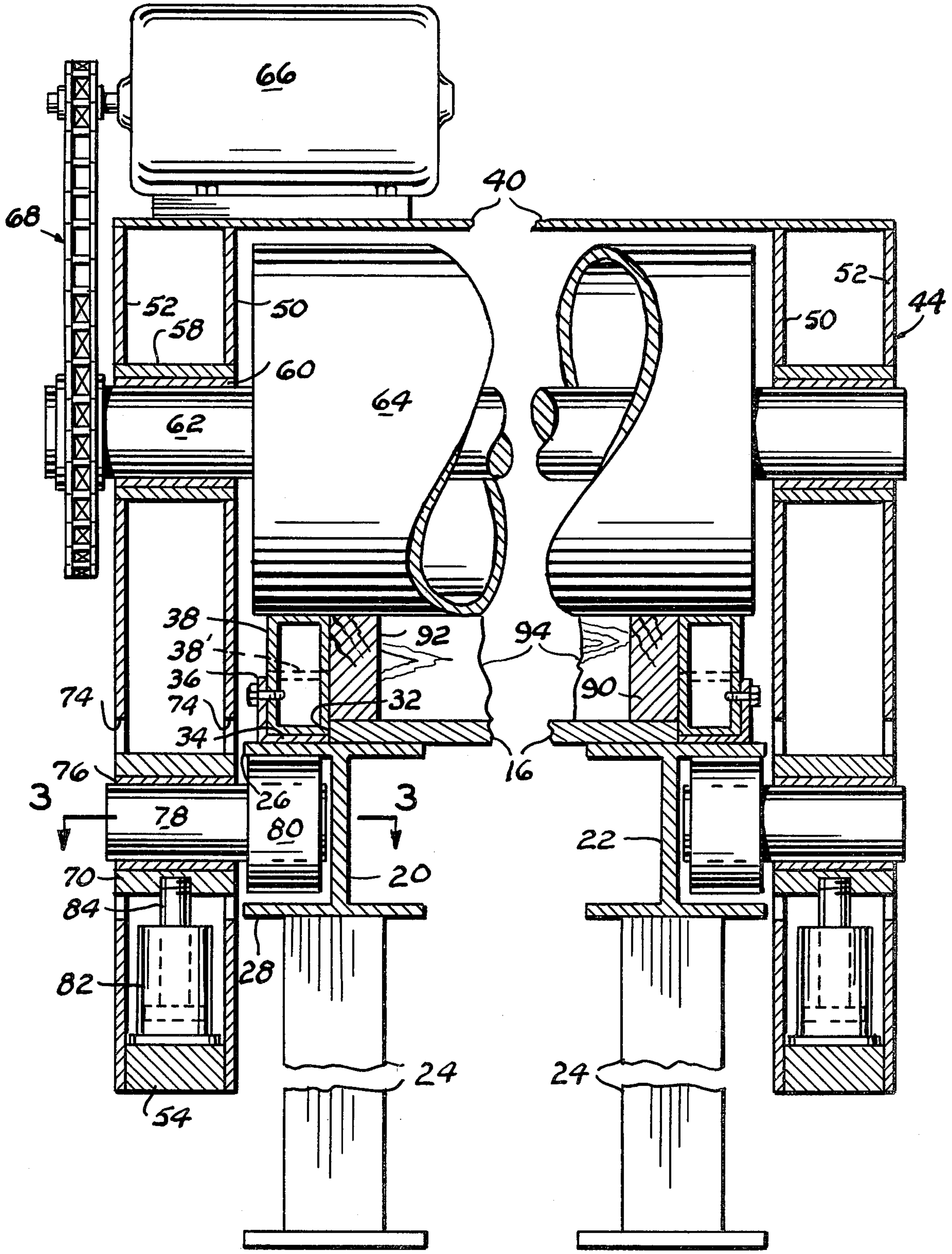
FIG. 2 is a fragmentary vertical cross sectional view, to a larger scale, taken substantially along the line 2—2 of FIG. 1 and omitting the discharge rollers for clarity.

Like characters of reference designate like parts in those figures of the drawings in which they occur.

In the drawings:

Referring more particularly to FIGS. 1 through 4, the reference numeral 10 indicates the apparatus, as a whole, comprising an elongated horizontal work supporting platform means 12 and a gantry means 14 extending transversely of the platform means 12 and movable therealong in opposing directions. The platform means 12 includes an elongated planar bed 16 which supports the components of a truss assembly 18 when placed thereon, as presently explained. The platform means 12 also includes a plurality of assembled truss discharge roller means 15 normally disposed below the horizontal top plane of the bed 16, as presently explained.

The respective longitudinal side edge portions of the bed 16 overlie a pair of horizontal wide flange I-beams 20 and 22. The I-beams 20 and 22 are supported, in a selected horizontal plane, by a plurality of legs or standards 24. The outboard upper and lower horizontally disposed flanges 26 and 28 of the respective I-beam form a pair of pressure roller tracks for moving the gantry means 14 longitudinally of the platform means, as presently explained.

A right angular member 30 longitudinally overlies the respective I-beam top flange 26 outwardly of the longitudinal side edge 32 of the bed plate 16 with its horizontal flange 34 abutting the bed plate edge 32 and its vertical flange 36 spaced outwardly of the bed plate side edge 32 forming a socket for receiving gantry drum tracks 38, as presently explained.

The gantry means 14 comprises a top frame 40 connected at its respective ends with depending vertical frame means 42 and 44 at respective sides of the platform means 12 and movably supported by the I-beams 20 and 22 by pairs of bearing and pressure roller means 46–48 horizontally spaced-apart longitudinally of the platform means. Since the vertical frame means 42 and 44 are substantially identical, only the frame means 42 is described in detail in the interest of brevity. The frame means 42 comprises a pair of horizontally spaced-apart inner and outer frame plates 50 and 52 rigidly secured at their upper ends to the depending surface of the top frame 40. The frame plates project downwardly beyond the lower limit of the horizontal plane of the I-beams a selected distance and are rigidly interconnected at their depending ends by a horizontal support 54 interposed between and rigidly secured to both plates. The central depending end portion of the outer plate 52 is cut away, as at 56, for the purposes presently apparent. The frame means 42 and 44 are further secured to the top frame 40 by other plates or braces, not shown for clarity.

Adjacent their upper limit, the plates 50 and 52 are horizontally apertured medially their width for receiving a bearing support 58 surrounding a bearing 60 journalling the shaft 62 of a large diameter roller or drum 64 normally supporting the gantry means 14 by overlying contact with the drum tracks 38. A reversible gantry driving motor 66, connected with a source of electracal energy, not shown, overlies one end portion of the top frame 40 and is drivably connected by chain and sprocket means 68 with one end of the drum shaft 62 for angular rotation of the drum, as presently explained. The width of the plates 50 and 52 is preferably greater than the diameter of the drum 64.

In the example shown, the pairs of bearing and pressure roller means 46 and 48 are disposed equidistant on opposing sides of the frame vertical center line passing through the axis of the drum shaft 62, however, only one pressure roller means may be used in each frame means 42 and 44, if desired, and in this event the outer frame plate 52 is not recessed at 56. Since the pressure roller means 46 and 48 are identical only the bearing and pressure roller means 46 will be described in detail in the interest of brevity. The bearing and pressure roller means 46 comprises a bearing housing 70 (FIG. 4) which is substantially square in horizontal section characterized by right angular rabbeted recesses 72 at its respective corners coextensive with the length or vertical height of the bearing housing. Each of the vertical frame means plates 50 and 52 are transversely apertured, adjacent their lateral limits, as at 74, in horizontal alignment for receiving the bearing housing 70 therein for vertical sliding movement relative to the plates 50 and 52. The vertical edge surfaces of the plates, defining the vertical apertures 74, nest the respective right angular rabbeted edge surfaces 72 of the bearing housing 70. Each plate vertical aperture 74 is of greater dimension than the vertical limit of the bearing housing 70, for the reasons presently apparent.

The bearing housing 70 is horizontally bored for receiving a bearing 76 journalling a pressure roller shaft 78 which projects inwardly of the vertical frame 42 toward the web of the adjacent I-beam 20. The inward end of the pressure roller shaft 78 is axially secured to a pressure roller 80. The diameter of the pressure roller 80 is less than the spacing between the upper and lower outboard flanges 26 and 28 of the I-beam 20, for the purpose presently explained.

An upstanding double action first pressure cylinder 82 is mounted on the upper surface of the vertical frame support 54 below the bearing housing 70 and has its piston rod 84 threadedly inserted into the depending end portion of the bearing housing.

A fluid pressure pump 86, having a handle 88, is mounted on the vertical frame support 54 between the pressure cylinders 82 and operatively connected therewith by tubing and valve controls, not shown, for raising and lowering the drum 64 relative to the platform means 12, as presently explained.

The truss components 18 are conventional in accordance with the particular truss being constructed and, in the example shown, comprises wooden 2×4 material. The truss components include upper and lower chords 90 and 92 which are manually positioned vertically edgewise, as shown, adjacent the inner surface of the respective drum track 38. Prior to arranging the truss components 18 on the bed 16, the gantry is positioned at one end portion of the platform and the drum 64 is lifted off the drum tracks 38 in the manner presently explained. Precut webs 94 are then disposed in a predetermined position on the bed 16 and extend angularly between the confronting surfaces of the upper and lower chords 90 and 92. A plurality of truss plates 96, one for each juncture of the webs with the chords, are manually positioned in over and underlying relation, respectively, at the juncture of the webs and chords.

The drum tracks 38 are preferably rectangular box-like in transverse section having a height equal to the vertical dimension of the 2×4s overlying the bed 16. In the event it is desired to form the truss by arranging the components flatly on the bed 16, the drum tracks 38 are replaced by an alternative pair of tracks 38', as illustrated by dotted lines (FIG. 2), in which the alternative tracks 38' have a vertical dimension above the bed 16 equal to the thickness of the 2×4s.

Referring also to FIGS. 5 through 8, each of the assembled truss discharge roller means 15 includes a discharge roller plate 100, a discharge roller bar 102 and a second pressure cylinder 104. The discharge roller plate 100 is elongated rectangular and extends transversely of the platform 12, within a cooperating opening 105 (FIGS. 1, 7 and 8) formed in the bed 16, in overlying relation at its respective end portions with respect to the inboard flanges of the I-beams 20 and 22 and in underlying relation with respect to the truss chords 90 and 92. The vertical thickness of the plate 100 is equal to the thickness of the bed 16 and the transverse width of the plate 100 is relatively narrow when compared with its length.

The discharge roller bar 102 is rectangular planar and is disposed vertically edgewise with its upper surface normally in close spaced relation with respect to the depending surface of the discharge roller plate 100. Lengthwise the roller bar 102 extends between the inner limits of the I-beams flanges. The discharge roller bar 102 is supported medially its ends by the piston rod of the second pressure cylinder 104. The second pressure cylinder 104 is a double acting cylinder and is connected with a source of fluid under pressure in a conventional manner.

A plurality of wheels or rollers 106 are journalled by bolt axles 108, or the like, in staggered relation on opposing sides of the roller bar 102 adjacent its upper limit so that a peripheral portion, less than 180° of each roller 106, projects above the horizontal plane of the upper limit of the roller bar 102. The roller plate 100 is provided with a like plurality of vertical slots 110, one for each roller 106, in cooperative overlying relation with respect to the rollers. The distance that each roller 106 projects above the upper limit of the discharge bar 102 is greater than the vertical thickness of the discharge roller plate 100 for the purposes presently apparent.

OPERATION

When all of the truss components 18 are disposed on the bed 16 in a predetermined position, the hydraulic pump handle 88 is manually operated to lift the pressure rollers 80 into contact with the depending surface of the outboard I-beam flanges 26 and produce a firm contact of the drum 64 against the upper surface of the drum tracks 38. The motor 66 is then energized to drive the drum 64 in a rolling action longitudinally of the platform means 12 in which the periphery of the drum 64, by rolling over the truss plates, force their nail-like projections into the surface of the webs and chords thus rigidly joining them together. After a single pass of the gantry means 14 longitudinally of the platform means 12, the fluid pump 86 is operated to lower the pressure rollers 80 into contact with the upper surface of the I-beam outboard flanges 28 to lift the drum 64 off its tracks 38 and the truss components so that the finished truss may be removed from the bed 16.

Figure 6:
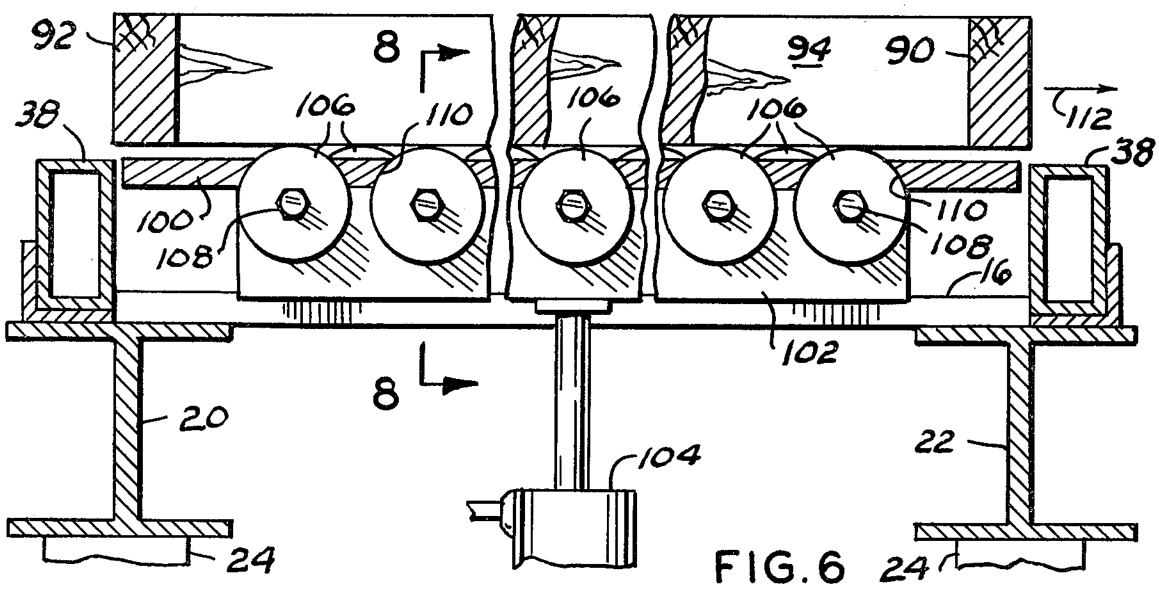
FIG. 6 is a view similar to FIG. 5 illustrating the discharge rollers in truss supporting position; and, FIGS. 7 and 8 are vertical cross sectional views, to a further enlarged scale, taken along lines 7—7 and 8—8 of FIGS. 5 and 6, respectively.
Figure 8:
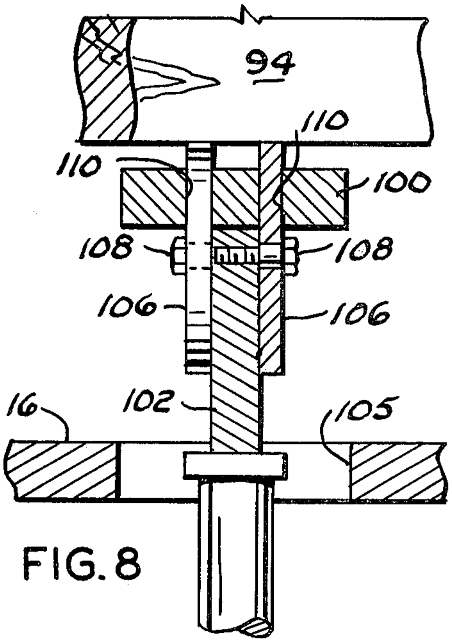

With the gantry means 14 disposed at one end of the platform 12, beyond one end of the assembled truss the pressure cylinders 104 are actuated to extend their piston rods and lift the discharge roller bars 102 into contact with the discharge roller plates 100 thus lifting the assembled truss components and upper limit of the top roller plates 100 above the horizontal plane defined by the upper limit of the tracks 38. In this position that portion of the discharge rollers 106 projecting upwardly beyond the horizontal plane of the respective discharge roller top plate 100, as illustrated by FIGS. 6 and 8, supports the assembled truss components and forms a laterally directed conveyor therefor. The assembled truss may then be moved laterally off the platform 12 as in the direction of the arrow 112.

Figure 5:
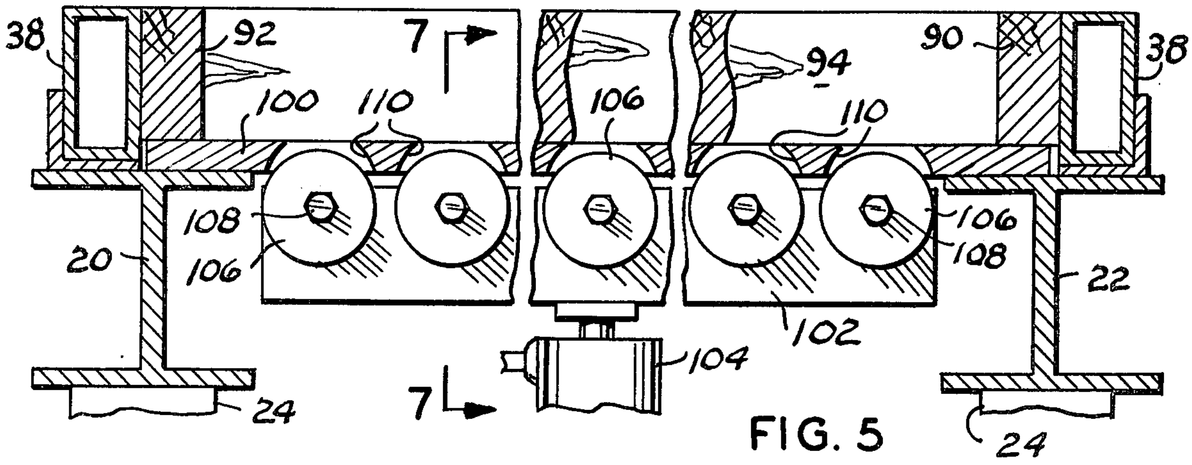
FIG. 5 is a fragmentary vertical cross sectional view, to a larger scale, taken along the line 5—5 of FIG. 1 illustrating the discharge rollers in retracted position.
Figure 7:
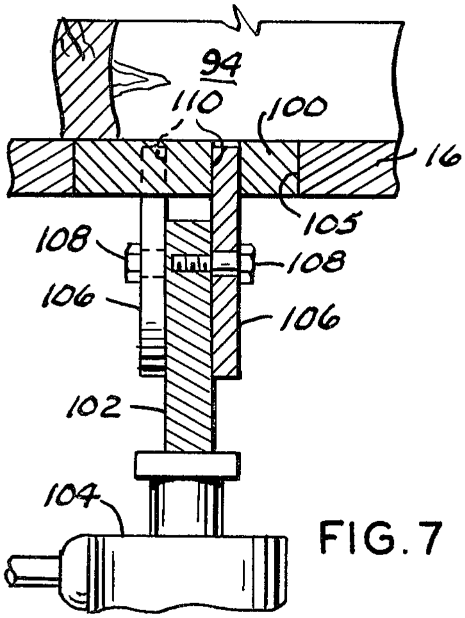

After removing the assembled truss from the discharge roller means 15, the respective discharge roller means 15 is retracted to the position illustrated by FIGS. 5 and 7 by retracting the piston rod of the second cylinders 104 to complete one cycle of operation.

Obviously the invention is susceptible to changes or alterations without defeating its practicability. Therefore, I do not wish to be confined to the preferred embodiment shown in the drawings and described herein.

I claim:

1. A truss joist assembling apparatus, comprising:
platform means including an elongated planar bed for supporting truss joist components when disposed thereon in a predetermined truss configuration, said platform means further including,
roller track means including flanged beams disposed at longitudinal sides of said bed defining horizontal vertically spaced confronting surfaces;
upstanding track means extending longitudinally of said bed adjacent its respective longitudinal sides for forming, in combination with said bed, lateral and vertical boundary limits of a truss joist;
gantry means including a drum overlying said upstanding tracks for movement longitudinally of said platform means, said gantry means further including,
vertical frame means disposed on opposing sides of said platform,
said drum having a shaft journalled by said vertical frame means; and,
a plurality of pressure roller means vertically movably supported by said vertical frames in contact with said roller track means for vertically moving said drum toward and away from said upstanding track means.

2. The apparatus according to claim 1 and further including:
first pressure cylinder means supported by said vertical frames and operatively connected with said plurality of pressure roller means for raising and lowering said pressure roller means relative to said vertical frames.

3. The apparatus according to claim 2 in which each said pressure roller means includes:
a bearing housing contained by the respective said vertical frame;
a pressure roller shaft journalled by said bearing housing; and,
a pressure roller loosely disposed between said vertically spaced confronting surfaces.

4. The apparatus according to claim 1 or 3 and further including:
motor means operatively connected with said drum shaft for moving said gantry means longitudinally of said platform means when said drum is in contact with said upstanding track means.

5. The apparatus according to claim 4 and further including:
a plurality of discharge roller means extending transversely of said platform means intermediate its ends for lifting and discharging assembled truss components laterally of said platform means.

6. The apparatus according to claim 6 in which said bed is provided with at least two transverse openings intermediate its ends and in which said discharge roller means includes:
a discharge roller plate nested by the respective bed opening and normally supported by said I-beams at its respective end portions;
a horizontal discharge roller bar longitudinally underlying each said discharge roller plate in downward spaced relation;
a plurality of discharge rollers journalled by each said discharge roller bar,
said discharge roller bar having a like plurality of discharge roller slots spanning an arc of the circumference of said discharge rollers below their uppermost limit when said discharge roller bar is elevated into contact with said discharge roller plate; and,
second pressure cylinder means for elevating said discharge roller bar and lifting said discharge roller plate above the horizontal plane of said platform means.

* * * * *